United States Patent
Marin et al.

(10) Patent No.: US 12,361,120 B2
(45) Date of Patent: Jul. 15, 2025

(54) AUTOMATIC DETECTION AND SECURE NOTIFICATION OF EVENTS VIA WEBHOOK LISTENER

(71) Applicant: DocuSign, Inc., San Francisco, CA (US)

(72) Inventors: Radu Marin, Seattle, WA (US); Ketan Ratnakar Bhave, Bothell, WA (US); Gorkem Yakin, Rancho Santa Fe, CA (US); Robert Boyer, Auburn, WA (US); Alan Gene Roza, Seattle, WA (US); David Wilson, Seattle, WA (US); Dennis Jay Dole, Des Moines, WA (US)

(73) Assignee: Docusign, Inc., San Francisco, CA (US)

( * ) Notice: Subject to any disclaimer, the term of this patent is extended or adjusted under 35 U.S.C. 154(b) by 178 days.

(21) Appl. No.: 17/993,414

(22) Filed: Nov. 23, 2022

(65) Prior Publication Data
US 2024/0169057 A1    May 23, 2024

(51) Int. Cl.
*G06F 21/45*    (2013.01)
*G06F 21/55*    (2013.01)

(52) U.S. Cl.
CPC ............ *G06F 21/552* (2013.01); *G06F 21/45* (2013.01); *G06F 2221/034* (2013.01)

(58) Field of Classification Search
CPC ... G06F 21/552; G06F 21/45; G06F 2221/034
USPC .......................................................... 726/23
See application file for complete search history.

(56) References Cited

U.S. PATENT DOCUMENTS

| | | | |
|---|---|---|---|
| 9,634,975 B2 | 4/2017 | McCabe et al. | |
| 10,430,570 B2 | 10/2019 | Gonser et al. | |
| 11,210,364 B1* | 12/2021 | Felt | G06F 16/176 |
| 11,379,686 B2* | 7/2022 | Coven | G06F 9/44526 |
| 11,689,508 B1* | 6/2023 | Abdelkader | H04L 63/0421 726/26 |
| 11,809,918 B1* | 11/2023 | Spagnolo | G06F 9/541 |
| 2013/0072153 A1* | 3/2013 | Lawson | H04L 67/54 455/410 |
| 2014/0282849 A1* | 9/2014 | Collison | H04W 12/68 726/1 |

(Continued)

OTHER PUBLICATIONS

Victor Chakraborty; Object Oriented Modeling of Secured Paid Virtual Event Management System; IJRASET; Year:2021; pp. 676-684.*

*Primary Examiner* — Monjur Rahim
(74) *Attorney, Agent, or Firm* — Shumaker & Sieffert, P.A.

(57) ABSTRACT

A method or a system accesses an envelope stored in a first database. The envelope includes a set of secure electronic documents, a workflow of tasks, and one or more events associated with the tasks. The system also accesses a second database that stores a credential of an entity associated with the envelope. In response to authenticating the credential, the system receives and caches an access token in a third database. Further, the system monitors the events associated with the tasks in the workflow. In response to detecting an occurrence of at least one event, the system generates and sends a message with the cached access token to a webhook listener. After authentication of the entity using the access token, the webhook listener is caused to generate and send a notification to an administrator of the entity.

20 Claims, 10 Drawing Sheets

(56) References Cited

U.S. PATENT DOCUMENTS

| | | | | |
|---|---|---|---|---|
| 2017/0323376 A1* | 11/2017 | Glaser | ............... | G06Q 30/0643 |
| 2019/0108419 A1* | 4/2019 | Coven | ...................... | G06F 8/60 |
| 2019/0149424 A1* | 5/2019 | O'Neill | ................... | G06F 9/541 |
| | | | | 709/224 |
| 2020/0274782 A1* | 8/2020 | Balaiah | ................... | H04L 67/10 |
| 2022/0027431 A1* | 1/2022 | Zheng | ................... | H04L 41/142 |
| 2022/0109696 A1* | 4/2022 | Deshmukh | ............. | H04L 43/06 |
| 2022/0247784 A1* | 8/2022 | Satish | ................ | H04L 63/0281 |
| 2022/0321345 A1* | 10/2022 | Ganchev | ............... | H04L 63/126 |
| 2023/0018809 A1* | 1/2023 | Deshmukh | ............. | H04L 63/20 |
| 2023/0185584 A1* | 6/2023 | Casalino | .............. | G06F 16/212 |
| | | | | 713/1 |
| 2023/0259922 A1* | 8/2023 | Rao | ...................... | H04L 9/3213 |
| 2023/0351290 A1* | 11/2023 | Chauhan | .................. | G06F 8/22 |

* cited by examiner

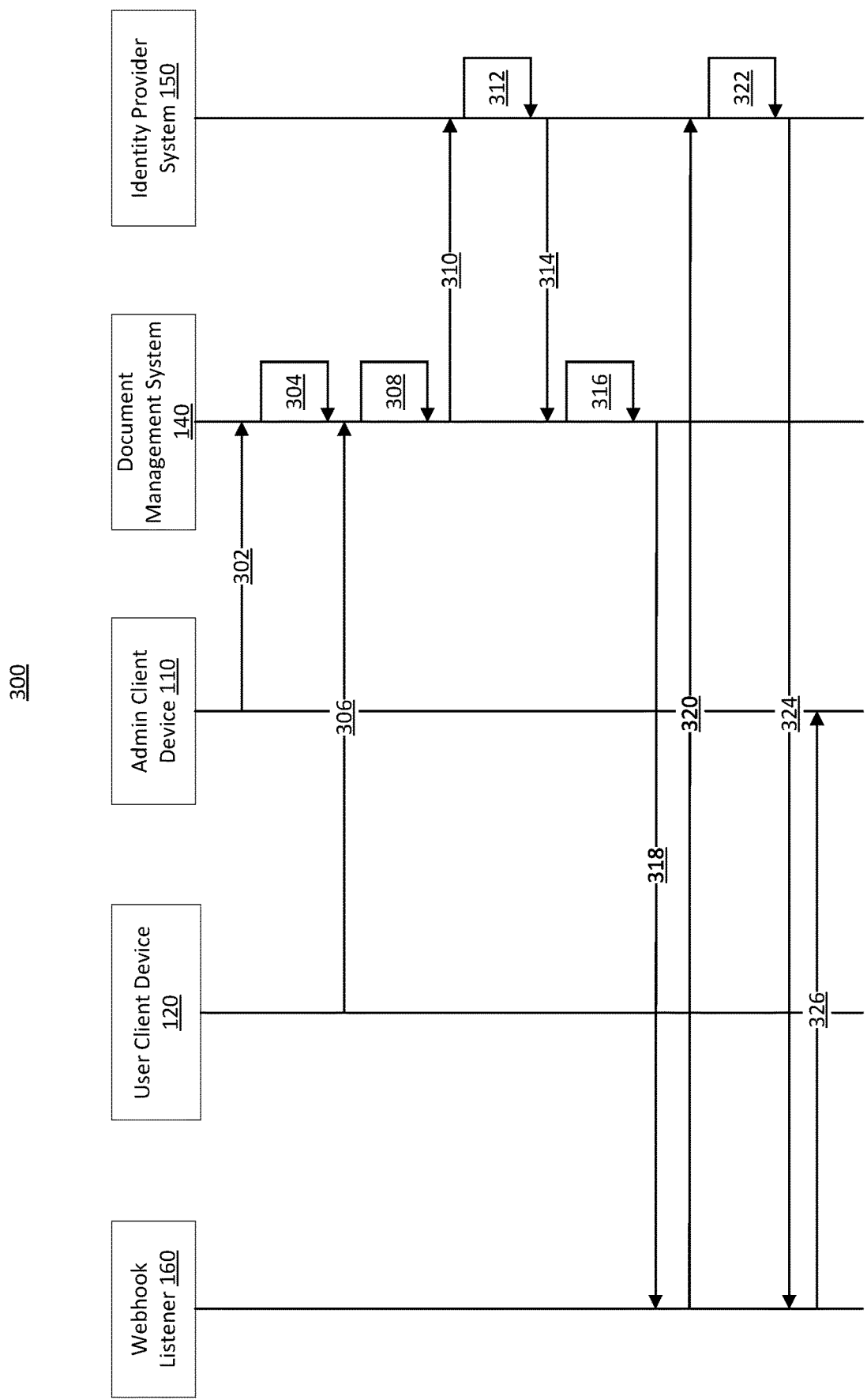

Connect 400

| APPLICATION | CONNECT KEYS | AUTH. PROTOCOL | PUBLISH | LOGS | FAILURES |

Protect your customer connect configurations with enhanced security by enabling Oauth. Oauth can ensure that a push notification has been sent from Document Server by passing an Access token from Authentication server back to your application.

Client ID

Client Secret

Token URL

Custom Parameters

Name                           Value

Name                           Value

+ ADD PARAMETER

SAVE

FIG. 4

AUTOMATIC DETECTION AND SECURE NOTIFICATION OF EVENTS VIA WEBHOOK LISTENER

TECHNICAL FIELD

The disclosure generally relates to the field of secure document management, and specifically to using a webhook and access token to monitor events associated with tasks performed on secure electronic documents.

BACKGROUND

A document management system enables a party (e.g., individuals, organizations, etc.) to create and send documents to one or more receiving parties for negotiation, collaborative editing, electronic execution (e.g., via electronic signatures), contract fulfillment, archival, analysis, and more. For example, the document management system allows users of the party to create, edit, review, and negotiate document content with other users and other parties of the document management system. Such documents may be stored and organized in a data structure, also referred to as an "envelope". Documents in an envelope are often associated with a sequence of tasks, such as signing by multiple parties, and authenticating the parties before the signing takes place, etc. When each task in the sequence is performed or fails to perform, an administrator or the involved parties would like to receive a notification.

However, such an existing document management system generally does not allow a browser or a user agent on a client device to call the document management system directly. Instead, the browser or a user agent is often required to make a call to an intermediate layer, such as a server, which, in turn, calls the online document management system. For such a client device to receive updates automatically, an application installed at a client device may be set to request an update from the server periodically. In response to receiving the request, the server sends an update, indicating that either nothing has occurred or an event has occurred. If nothing has occurred, the application will request an update again at a later time. This process may repeat as many times as necessary until all the monitored events have occurred. Such a polling mechanism may result in many fruitless calls, inefficient bandwidth usage, and limit the scalability of the online document management system.

SUMMARY

Principles described herein solve the problem of existing document management systems by using a secure webhook to generate notifications only when monitored events occur, as such, no unnecessary calls are performed, which enables the scalability of the document management system and increases the efficiency of network bandwidth usage.

Embodiments include a method or a system for monitoring events associated with tasks performed on secure electronic documents. The system accesses a first database that stores an envelope. The envelope includes a set of secure electronic documents, a workflow of tasks that are to be performed on the set of secure electronic documents, and one or more events associated with the tasks. For example, in some embodiments, the events are associated with completion of the tasks in the workflow.

In some embodiments, the workflow of tasks and the events are defined by an administrator. In some embodiments, defining the workflow of tasks and the events includes selecting one of a plurality of authentication protocols to be used for the authentication of the entity. In some embodiments, defining the workflow of tasks and the events includes setting one or more parameters and their corresponding values associated with the authentication. Values of the one or more parameters are to be verified during the authentication.

The system also accesses a second database that stores a credential of an entity associated with the envelope. The credential delegates the document management system to send messages associated with events to a webhook listener on behalf of the entity. The system then sends the credential to an authentication service. In response to authentication of the credential, the system receives an access token from the authentication service and caches the access token in a third database, where the access token has a defined validity time range.

At the same time, the system monitors the events associated with the tasks in the workflow. In response to detecting an occurrence of at least one of the events, the system generates a message based on the event, and sends the cached access token and the message associated with the event to a webhook listener, causing the webhook listener to verify whether the access token is valid. Responsive to verifying that the access token is valid, the webhook listener is caused to generate and send a notification to an administrator, an application, and/or any user of the entity that is set up to receive the notification. On the other hand, responsive to a verification failure (which may be caused by various reasons, such as expiration of the access token), the system may be caused to obtain a new access token.

In some embodiments, the webhook listener exposes an endpoint uniformed resource locator (URL) configured to receive the access token and messages associated with events. In some embodiments, the system is configured to instantiate the webhook listener. In some embodiments, the webhook listener is entity specific, such that a different entity is associated with a different webhook listener. In some embodiments, the webhook listener is envelope specific, such that a different envelope is associated with a different webhook listener.

In some embodiments, the system further provides a graphical user interface that allows the administrator to enter custom parameters, which are to be verified during the authentication. In some embodiments, the document management system is configured to concatenate the custom parameters with the credential when requesting an authentication, as such the authentication is performed in a manner that satisfies custom constraints desired by the entity.

In some embodiments, the messages associated with events are packaged in a specific data structure. In some embodiments, the specific data structure is in JSON format. In some embodiments, the specific data structure is in XML format.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 illustrates communication patterns among an online document system, an identity provider system, an administrative client device, a user client device, and a webhook listener, in accordance with an example embodiment.

FIG. 4 illustrates an example interface of the document management system that allows an administrator to select an authentication protocol and/or set up customer parameters associated with authentication, in accordance with an example embodiment.

DETAILED DESCRIPTION

Figure 1:
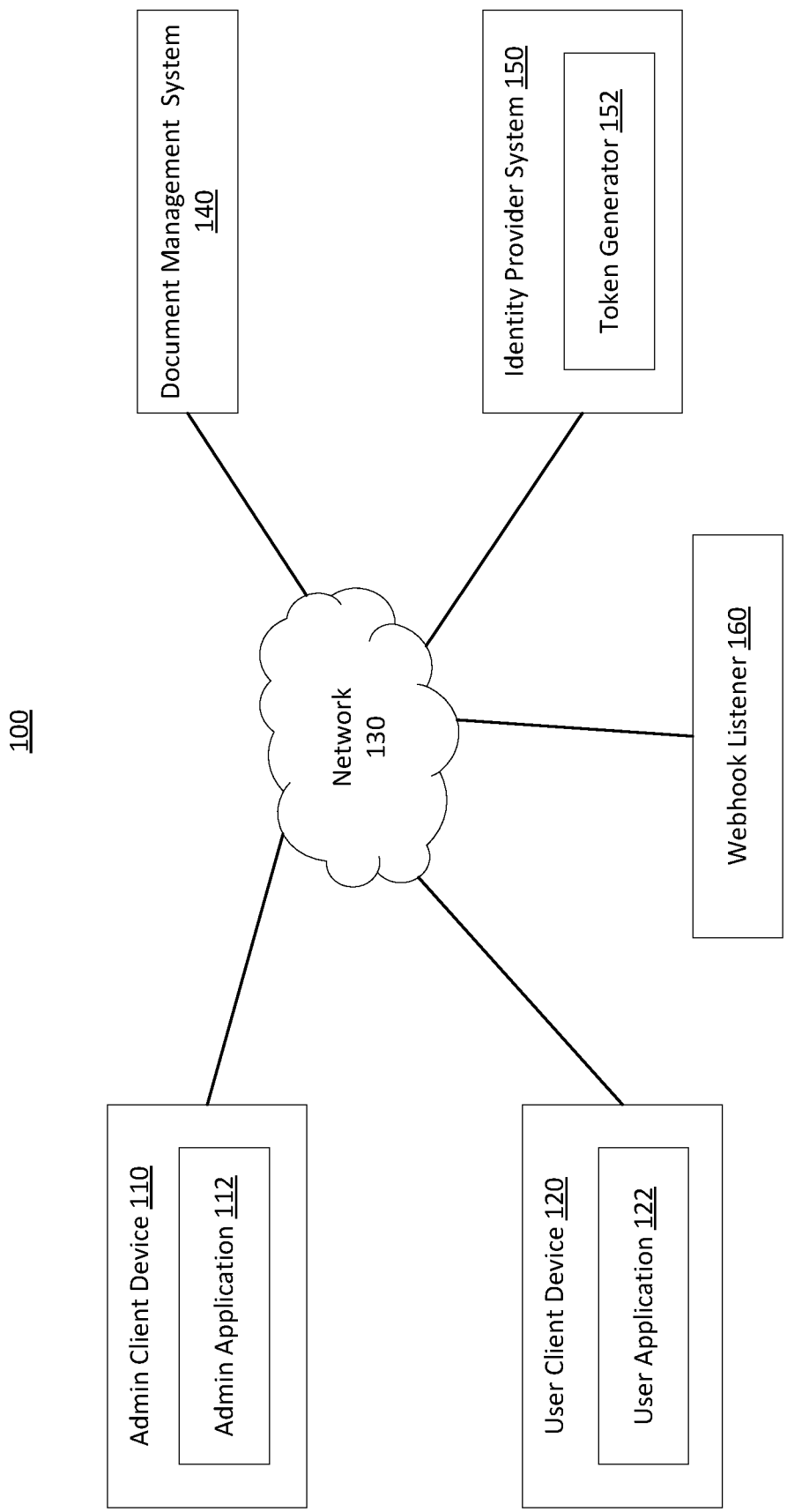
FIG. 1 is a high-level block diagram of a system environment for a document management system, in accordance with an example embodiment.

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Overview

A document management system enables a party (e.g., individuals, organizations, etc.) to create and send documents and/or envelopes to one or more receiving parties for negotiation, collaborative editing, electronic execution (e.g., via electronic signatures), contract fulfillment, archival, analysis, and more. For example, the document management system allows users of the party to create, edit, review, and negotiate document content with other users and other parties of the document management system. An example document management system is further described in U.S. Pat. No. 9,634,975, issued Apr. 25, 2017, and U.S. Pat. No. 10,430,570, issued Oct. 1, 2019, which are hereby incorporated by reference in their entirety.

In some embodiments, a document management system generally does not allow a browser or a user agent on a client device to call the document management system directly. In such embodiments, the browser or a user agent is often required to make a call to an intermediate layer, such as a server, which, in turn, calls the online document management system. In an example solution for such a client device to receive updates automatically, an application installed at a client device may be set to request an update from the server periodically. In response to receiving the request, the server sends an update, indicating that either nothing has occurred or an event has occurred. If nothing has occurred, the application will request an update again at a later time. This process may repeat as many times as necessary until all the monitored events have occurred.

However, if an event does not occur for a prolonged period, such as a week, a month, or a few months, the applications and the server would repeatedly send a large number of requests and generate a large number of updates, resulting in excessive consumption of network bandwidth and computation resources. The methods described herein solve the above-described problem by monitoring events associated with workflows of tasks defined by administrators of entities, and securely sending messages to a webhook listener in response to detecting an occurrence of at least one event. As such, no excessive communications are generated for mere inquiry about the status of events.

Further, to ensure that the message is truly sent from the document management system, an authentication mechanism may be selectively implemented. The message includes an access token that can be verified by the webhook listener. After the webhook listener verifies the access token, the webhook listener generates and sends a notification to an administrator of an entity, an application, or any client device or user associated with the entity that is set to receive the notification. As such, a notification is generated only when it is verified that an event is detected by the document management system, and unauthorized or unauthenticated messages will not trigger such a notification.

Additionally, each access token has a defined validity time range. To further reduce the computations and communications related to requesting and receiving access token, the document management system may cache the access token in a database. Responsive to detecting an event, the document management system retrieves the cached access token and send the cached access token with the message to the webhook listener, which further reduces the computations and communications occurring at the document management system.

It should be noted that although description may be limited in certain contexts to a particular environment, this is for the purposes of simplicity only, and in practice the principles described herein can apply more broadly to the context of any digital transaction management platform. The system environment described herein can be implemented within the document management system, a document execution system, or any type of digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

FIG. 1 is a high-level block diagram of a system environment 100 for a document management system 140, in accordance with an example embodiment. The environment 100 includes an administrator client device 110, a user client device 120, an identity provider system 150, and a webhook listener 150, configured to communicate among each other via a network 130. In various embodiments, the system environment 100 may include different, additional, or fewer devices or modules than those described in conjunction with FIG. 1.

The document management system 140 is a computer system (or group of computer systems) for storing and managing documents for users. Using the document management system 140, users can collaborate to create, edit, review, store, analyze, manage, and negotiate documents, such as the set of contract documents. Example contract documents include employment agreements, purchase agreements, service agreements, financial agreements, master services agreements, intellectual property licensing agreements, rental agreements, mortgage agreements, and so on. The users and/or entities associated with the administrator client device 110 and user client device 120 may be parties to the contract documents.

The document management system 140 can be a server, server group or cluster (including remote servers), or another suitable computing device or system of devices. In some implementations, the document management system 140 can communicate with user client device 120 over network 130 to receive instructions and send documents (or other information) for viewing on client devices 120. The document management system 140 can assign varying permissions to individual users or groups of users controlling which documents each user can interact with and what level of control the user has over the documents they have access to.

In some embodiments, the document management system 140 may distribute a part of processing functions to client devices, such as administrator client device 110 or user client device 120, where applications installed thereon may perform the distributed processing functions. Additional details about the document management system 140 will be discussed in further detail below with respect to FIGS. 2A-2D.

The administrator client device 110 or the user client device 120 is a computing device capable of transmitting and/or receiving data over network 130. Each administrator client device 110 or user client device 120 may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, user client devices 120 may include a camera application through which the users can capture photographs of documents.

In some embodiments, the user client device 120 includes a user application 122 through which the users can access the document management system 140. The application may be a stand-alone application downloaded by the user client device 120 from the document management system 140. Alternatively, the user application 122 may be accessed by way of a browser installed on the user client device 120 and instantiated from the document management system 140. The user client device 120 enables the user to communicate with the document management system 140. For example, the user client device 120 enables the user to upload, access, review, execute, and/or analyze documents within the document management system 140 via a user interface. In some implementations, the user can also include AIs, bots, scripts, or other automated processes set up to interact with the document management system 140 in some way. According to some embodiments, the user is associated with permissions definitions defining actions the user can take within the document management system 140, or on documents, templates, permissions associated with other users and/or workflows.

In some embodiments, the document management system 140 includes an API that enables different applications installed on the user client device 120 to communicate therewith. For example, a photo application or a third-party cloud storage application installed on a mobile device may be allowed to upload photos or documents to the document management system 140 via the API. As another example, an application or a web service of a particular entity may also be allowed to communicate with document management system 140 via the API.

The identity provider system 150 is configured to provide identity service. The identity provider system 150 may include a token generator 152. The identity provider system 150 is configured to receive credentials associated with entities. The entities are associated with documents stored in the document management system 140. For example, the entities may be owners of the envelopes. Alternatively or in addition, the entities may be parties involved in tasks to be performed on the documents contained in the envelopes, such as signing a document. In some embodiments, the entities provide their credentials to the document management system 140, and the credentials delegate certain permissions to the document management system 140. For example, the credentials may permit the document management system 140 to send messages associated with events to webhook listeners, allowing the webhook listeners to verify that the messages are received from the document management system 140 related to the documents associated with the entity.

Responsive to authenticating the credential, the token generator 152 generates an access token, and sends the access token to the document management system 140, which may in turn cache the access token. The document management system 140 also monitors events associated with workflows of tasks. Responsive to detecting an occurrence of at least one event, the document management system 140 generates a message and sends the message with the cached access token to the webhook listener 160.

The webhook listener 160 is an application that exposes an endpoint uniform resource locator (URL) that will receive event messages associated with predefined events from the document management system 140. In some embodiments, the webhook listener 160 may be provided by the document management system 140. Alternatively, the webhook listener 160 may be provided by an entity associated with the workflow of tasks or a third party service. Responsive to receiving the event messages, the webhook listener 160 is configured to verify the access token is valid. Responsive to verifying that the access token is valid, the webhook listener sends a notification to the administrator client device 110, and/or any other client devices associated with the entity that are set to receive such a notification.

The administrator client device 110 may have an administrator application 112 installed thereon. The administrator application 112 may be a mobile application downloaded from an application store or from the document management system 140, or a web application that is accessible via a browser. In some embodiments, an administrator application 112 is configured to allow an administrator to configure the document management system 140, such as setting up an authentication method to be used to authenticate the entity and/or the document management system 140, and/or set up the webhook listener 160. In some embodiments, the administrator application 112 may also be configured to receive the notification from the webhook listener 160.

The network 130 transmits data within the system environment 100. The network 130 may be a local area or wide area network using wireless or wired communication systems, such as the Internet. In some embodiments, the network 130 transmits data over a single connection (e.g., a data component of a cellular signal, or Wi-Fi, among others), or over multiple connections. The network 130 may include encryption capabilities to ensure the security of customer data. For example, encryption technologies may include secure sockets layers (SSL), transport layer security (TLS), virtual private networks (VPNs), and Internet Protocol security (IPsec), among others.

Example System Architecture of Document Management System

Figure 2A:
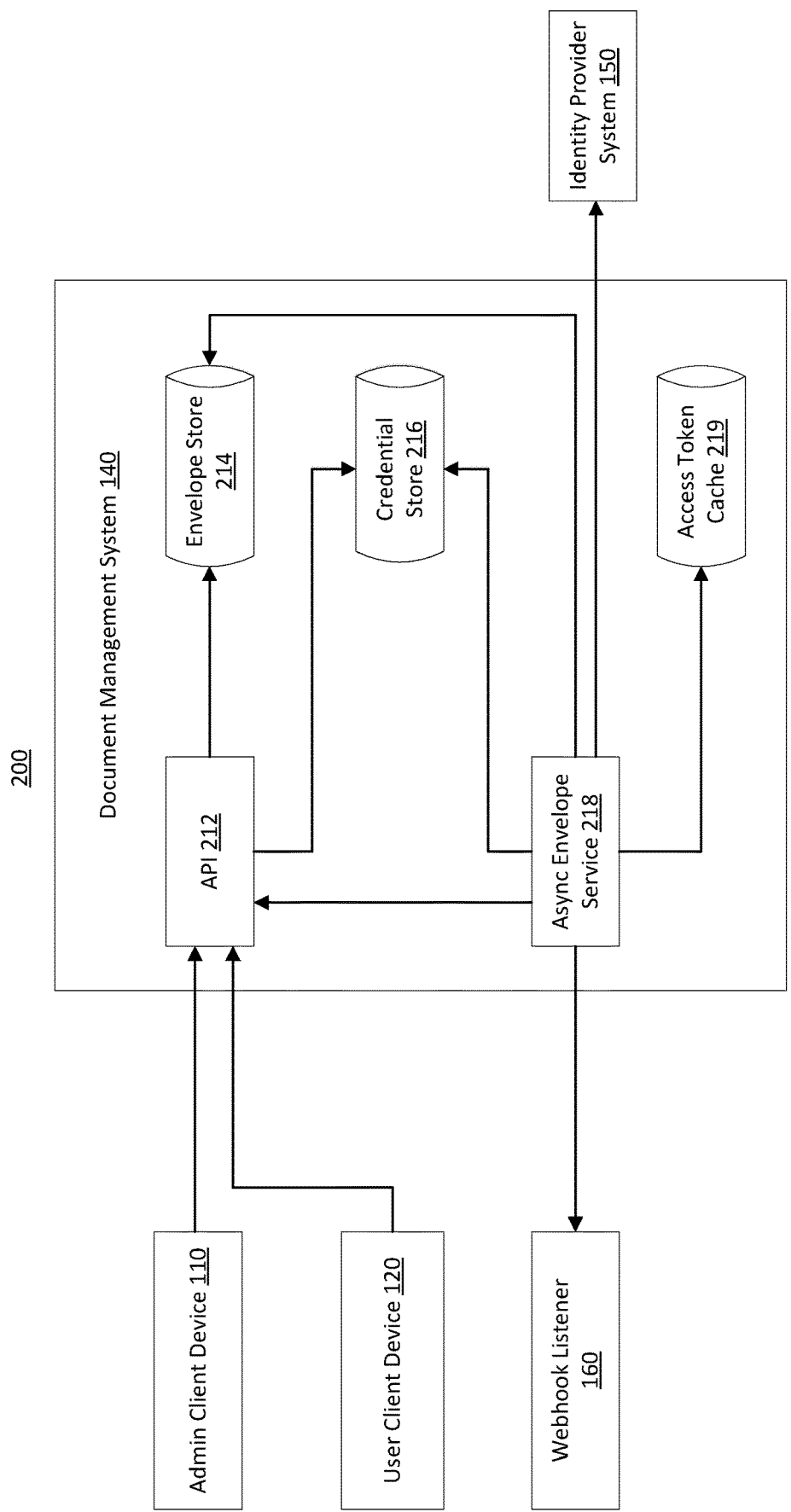
FIGS. 2A-2D are block diagrams of a system architecture of the document management system, in accordance with an example embodiment.

FIGS. 2A-2D are high-level block diagrams of a system architecture 200 of the document management system 140, in accordance with an example embodiment. Referring to FIG. 2A, the document management system 140 includes an Application Programming Interface (API) 212, an asynchronous envelope service 218, an envelope store 214, a credential store 216, and an access token cache store 219.

The API 212 includes a set of definitions and protocols for integrating applications with the document management system 140. For example, the administrator client device 110 (and/or an administrator application 112 installed thereon) or the user client device 120 (and/or a user application 122 installed thereon) may be configured to access the envelope store 214 and/or credential store 216 of the document management system 140 via the API 212. In some embodiments, the API 212 is a REST API that conforms to the constraints of REST (representational state transfer) architectural styles and allows for interaction with RESTful web services.

The envelope store 214 is configured to store envelopes and configurations associated therewith. In some embodiments, an envelope contains a set of secure electronic documents, a workflow of tasks that are to be performed on the set of secure electronic documents, an identity of a user that is to perform at least one task in the workflow, and/or one or more events associated with the tasks. In some embodiments, the events are associated with completion of the tasks. The tasks may include (but are not limited to) authentication of the identity of the user, review of a particular secure electronic document by the user, signing of a particular secure electronic document by the user, etc.

The credential store 216 is configured to store credentials associated with entities. The entities are associated with the envelopes stored in the envelope store. In some embodiments, the credentials associated with the entities delegate the document management system 140 permission to send messages to the webhook listener 160 responsive to detecting an occurrence of an event. The asynchronous envelope service 218 is configured to use the credential to obtain an access token from the identity provider system 150. Responsive to receiving the credential from the asynchronous envelope service 218, the identity provider system 150 verifies the credential. In response to successful verification of the credential, the identity provider system 150 generates and sends an access token to the asynchronous envelope service 218, which in turn caches the access token in the access token cache store 219.

The asynchronous envelope service 218 is configured to detect occurrences of events defined in the envelope. For example, in some cases, an event is associated with signing a document by a user. Responsive to detecting that the user has signed the document, the asynchronous envelope service 218 generates a message describing the detected event and sends the message with the cached access token to webhook listener 150. The access token has a defined validity time range. In some embodiments, the async envelope service 218 may be configured to cache the access token in the access token cache store 219 for the defined validity time range. As such, no additional authentication request is necessary during the defined validity time range, and the cached access token may be reused during the defined validity time range.

Responsive to receiving the access token and the messages, the webhook listener 160 passes the access token to the identity provider system 150, which in turn verifies whether the access token is valid. Responsive to verifying that the access token is valid, the webhook listener 160 generates and sends a notification to the administrator client device 110, any application or any client device that is set up to receive the notification.

Notably, the administrator client device 110, the user client device 120, and/or the webhook listener 160 may simultaneously, sequentially, and/or independently communicate with the document management system 140 and/or the identity provider system 150.

Figure 2B:
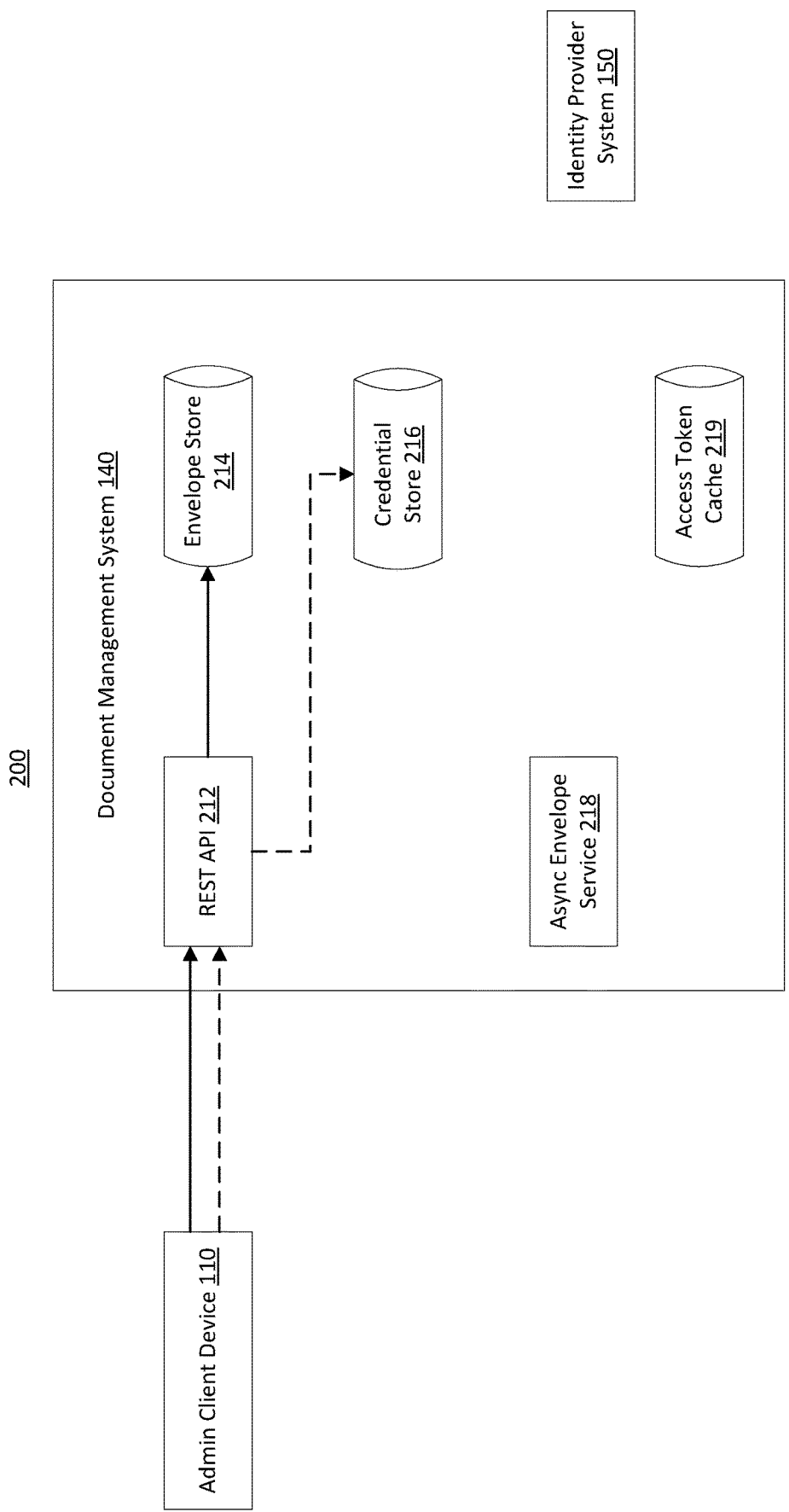

FIG. 2B illustrates an example scenario in which the administrator client device 110 generates or modifies configurations associated with envelopes stored in the envelope store 214 via API 212, and/or enters or modifies credentials stored in the credential store 216 via API 212. The configurations may include configuring read and/or write permissions to envelopes stored in the envelope store 214. The read and/or write permissions are granted to particular users and/or applications.

The configuration may also include defining a workflow of tasks that are to be performed on envelopes stored in envelope store 214. For example, a workflow of tasks may include a task of signing a document by a user, authenticating an identity of the user before signing of the document, etc. The configurations may also include setting up events and a webhook listener. Once the events and the webhook listener are set up, the document management system 140 is configured to detect those events, and responsive to detecting the events, the document management system 140 would send a message to the webhook listener, causing the webhook listener to generate and send a notification to the administrator.

The configurations may also include a requirement for authentication to be performed by the webhook listener, such that the webhook listener can make sure that the received messages are indeed sent from the document management system 140. When a particular authentication method is selected during the configuration, an administrator may be prompted to enter a credential of an entity associated with the envelope. The entered credential is then stored in the credential store. The credential delegates the document management system 140 to send messages associated with events to the webhook listener 160.

Figure 2C:
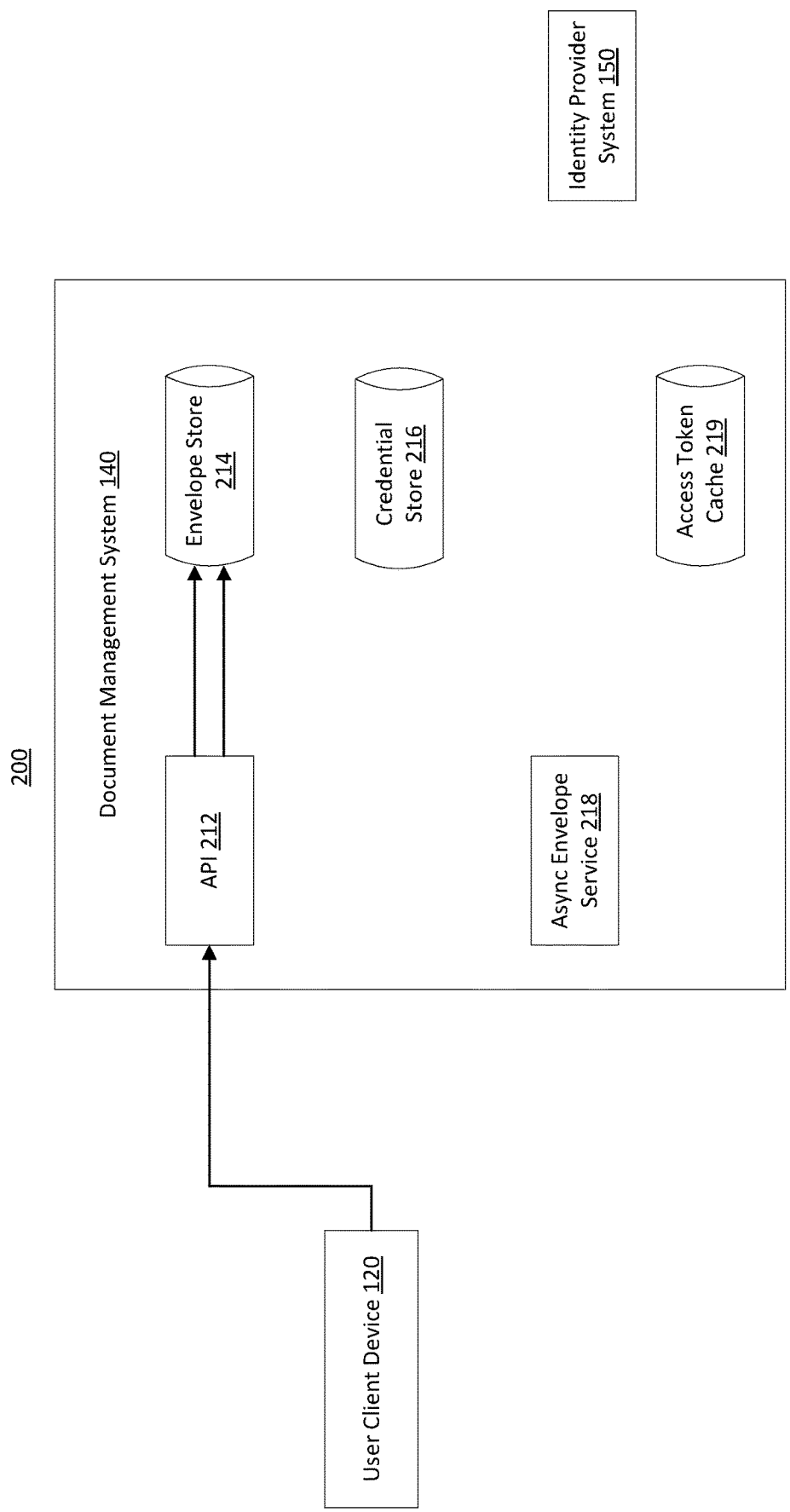

FIG. 2C illustrates an example scenario in which the user client device 120 accesses an envelope stored in the envelope store 214 via API 212. The user client device 120 may read the envelope and associated configurations from the envelope store 214. Depending on the user's permission, the user client device 120 may also be able to create and/or modify an envelope, and/or perform tasks on secure documents contained in the envelope. After the creation, modification or performance of tasks on secure documents contained in the envelope, data associated with the secure documents or envelope is then saved in the envelope store 214.

Figure 2D:
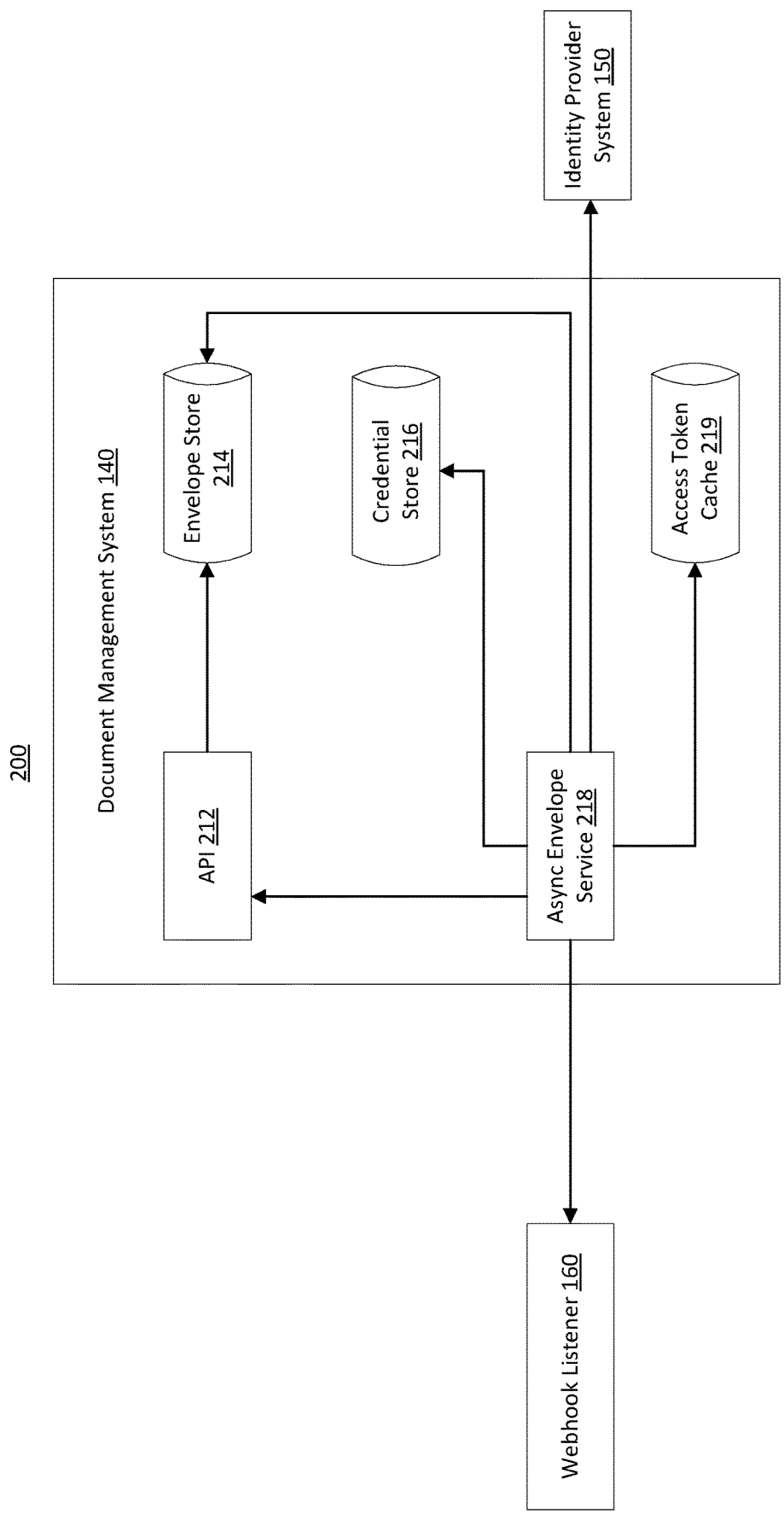

FIG. 2D illustrates an example scenario in which the asynchronous envelope service 218 monitors events associated with envelopes stored in the envelope store 214. The asynchronous envelope service 218 is configured to read and retrieve the envelope data and associated configuration, and detect an occurrence of an event based on the retrieved envelope data and associated configuration. Responsive to detecting an occurrence of at least one event, the asynchronous envelope service 218 is configured to generate and send messages to the webhook listener 150.

When an authentication is required by the configuration, the asynchronous envelope service 218 is configured to retrieve the credential of the entity from the credential store 216, and send the credential to the identity provider system 150, causing the identity provider system 150 to authenticate the credential. Responsive to authenticating the credential, the identity provider system 150 generates and sends an access token to the async envelope service 218. The async envelope service 218 can then send the access token with the message associated with the event to the webhook listener 160. Responsive to receiving the access token and the messages associated with the event, the webhook listener 160 can then verify the access token with the identity provider system 150. If the access token is valid, the webhook listener 160 understands that the messages are indeed received from the document management system 140, and generates and sends a notification to the administrator client device 110, an application, and/or any other client device that is set up to receive the notification. Otherwise, the webhook listener 160 may ignore the messages, or request for a new access token.

Each access token has a defined validity time range. In some embodiments, the asynchronous envelope service 218 is further configured to store the access token in the access token cache store 219, such that the same access token may be reused during the define validity time range, which further reduces the amount of data that must be transmitted between the document management system 140 and the identity provider system 150, and therefore, computations associated therewith are also reduced.

FIG. 3 illustrates an example communication pattern 300 that may be performed among the document management system 140, the identity provider system 150, the administrator client device 110, user client device 120, and webhook listener 160. First, the administrator client device 110 generates or modifies configurations associated with document management system 140, which is represented by arrow 302. The configurations may include a workflow of tasks, and events associated with tasks. The configurations may also include a requirement of a particular authentication method to be used. For example, the particular authentication method may include (but is not limited to) OAuth, OAuth 0, OAuth 2, etc. When a particular authentication method is required, the configurations may also include credentials of entities that are to be authenticated by identity provider system 150. Responsive to receiving the configurations, the document management system 140 stores the configurations in a database (e.g., the envelope store 214 or credential store 216 of FIGS. 2A-2D), represented by arrow 304.

The document management system 140 is configured to monitor events defined in the configurations. When a user client device 120 accesses (e.g., modifies or performs a task on) a secure document stored in the document management system 140, which is represented by arrow 306, the document management system 140 determines whether an event has occurred, which is represented by arrow 308. Responsive to detecting an event, the document management system 140 retrieves and sends a credential associated with the event to the identity provider system 150, which is represented by arrow 310. After receiving the credential from the document management system 140, the identity provider system 150 authenticates an entity based on the credential, which is represented by arrow 312. Responsive to successful authentication, the identity provider system 150 generates and sends an access token to the document management system 140, which is represented by arrow 314.

In some embodiments, after receiving the access token, the document management system 140 caches the access token, generates a message associated with the detected event, and package the message with the received access token, which is represented by arrow 316, and sends the packaged message to the webhook listener 160, which is represented by arrow 318. Responsive to receiving the message with the access token, the webhook listener 160 sends the access token to the identity provide system 150, which is represented by arrow 320. After receiving the access token, the identity provider system 150 verifies whether the access token is valid, which is represented by arrow 322. Responsive to determining that the access token is valid, the identity provider system 150 notifies the webhook listener 160, which is represented by arrow 324, causing the webhook listener 160 to generate a notification to notify the administrator client device 110, which is represented by arrow 326.

Notably, in the step of issuing (represented by arrow 312) the access token by the document management system 140 or the step validating (represented by arrow 322) the access token by the identity provider system 150, there is a possibility that the identity provider system 150 determines that the credential or the access token is invalid. In such a case, the identity provider system 150 will refuse to issue an access token or refuse to validate the access token, and/or request a new credential or access token. Various reasons may cause such types of failure. For example, the credential may be set up incorrectly or revoked by the administrator. As another example, the access token may be expired. If the access token has been expired, the document management system 140 can simply send the credential to the identity provider system 150 again, obtain a new access token with a new expiration time, and resend the message with the new access token to the webhook listener 160.

FIG. 4 illustrates an example user interface 400 that may be provided by the document management system 140 for an administrator (displayed at administrator client device 110) to set up configurations associated with authentication protocols and/or parameters associated therewith. In some embodiments, the administrator can select an authentication protocol or method, such as (but not limited to) OAuth, OAuth 0, and/or OAuth 2.0. Depending on the selected authentication protocol, the administrator can then set up a client ID (e.g., a username), a client secret (e.g., a password), and a token URL. The token URL may be an authorization server or an identity provider service configured to receive the credential, authenticate the client ID, and generate an access token. In some embodiments, the administrator is also allowed to set up custom parameters and their corresponding values. The customer parameters may include attributes such as scope or audience specific to the entities' own networks. Once the customer parameters are set up, values of the customer parameters may also be verified during the authentication. In some embodiments, the document management system 140 is configured to concatenate the custom parameters with the credential when requesting an authentication, as such the authentication is performed in a manner that satisfies custom constraints desired by the entity. The implementation of the authentication protocol and/or custom parameters provides an added layer of protection keeping entities' data secure.

In some embodiments, the administrator is also allowed to fill in a URL for the webhook listener, to which the document management system 140 will send messages (also referred to as notification triggers). The notification trigger contains data describing a detected event, and a cached access token. When the webhook listener receives a notification trigger, the webhook listener is triggered to attempt to use the access token to authenticate the message or source of the message. As previously described, the access token has a defined validity time range, and the access token is also associated with a specific entity and/or webhook listener. Thus, if the access token has expired, or was issued for a different entity, the authentication would fail.

In some embodiments, the webhook listener may ignore the message if the authentication fails. Alternatively, the webhook listener may be triggered to perform additional actions, such as sending a notification and/or a request to the document management system 140, causing the document management system 140 to obtain a new access token. In some embodiments, the document management system 140 automatically requests a new access token at a frequency corresponding to the validity time range of the access token, such as every 5 minutes, 10 minutes, 1 hour, etc. In some embodiments, the document management system 140 requests a new access token in response to receiving a notification from the webhook listener indicating that the cached access token has expired.

In some embodiments, the document management system 140 is configured to instantiate a webhook listener. In some embodiments, the webhook listener may be entity specific, such that a different entity is associated with a different webhook listener. In some embodiments, the webhook listener is envelope specific, such that a different envelope is associated with a different webhook listener. When a webhook listener is entity specific, a same cached access token may be reused in many events associated with many envelopes, significantly reducing the communications and computations required for repeatedly requesting for access tokens from an identity provider system.

Computing Machine Architecture

Figure 5:
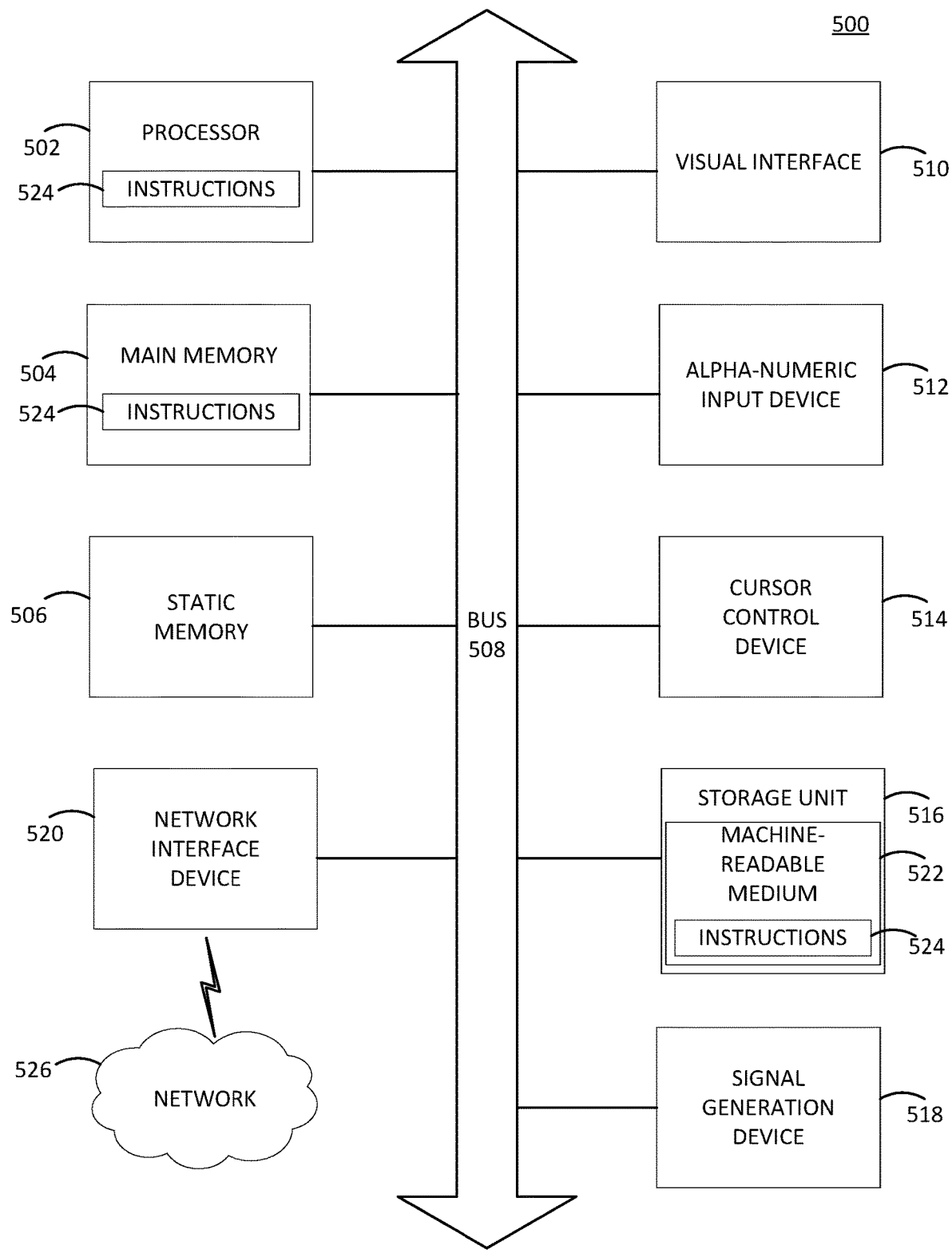
FIG. 5 illustrates is a block diagram illustrating a computer system for use in providing an online document system, in accordance with an embodiment.

FIG. 5 is a block diagram illustrating a computer system 500 for use in managing actions, in accordance with an embodiment. The computer system 500 is able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein. Any client device or service disclosed herein may use some or all functionality described with respect to the machine.

The example computer system 500 includes a processor 502 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Example Methods for Monitoring Events and Generating Notifications in Response to Detecting Occurrence of Events.

Figure 6:
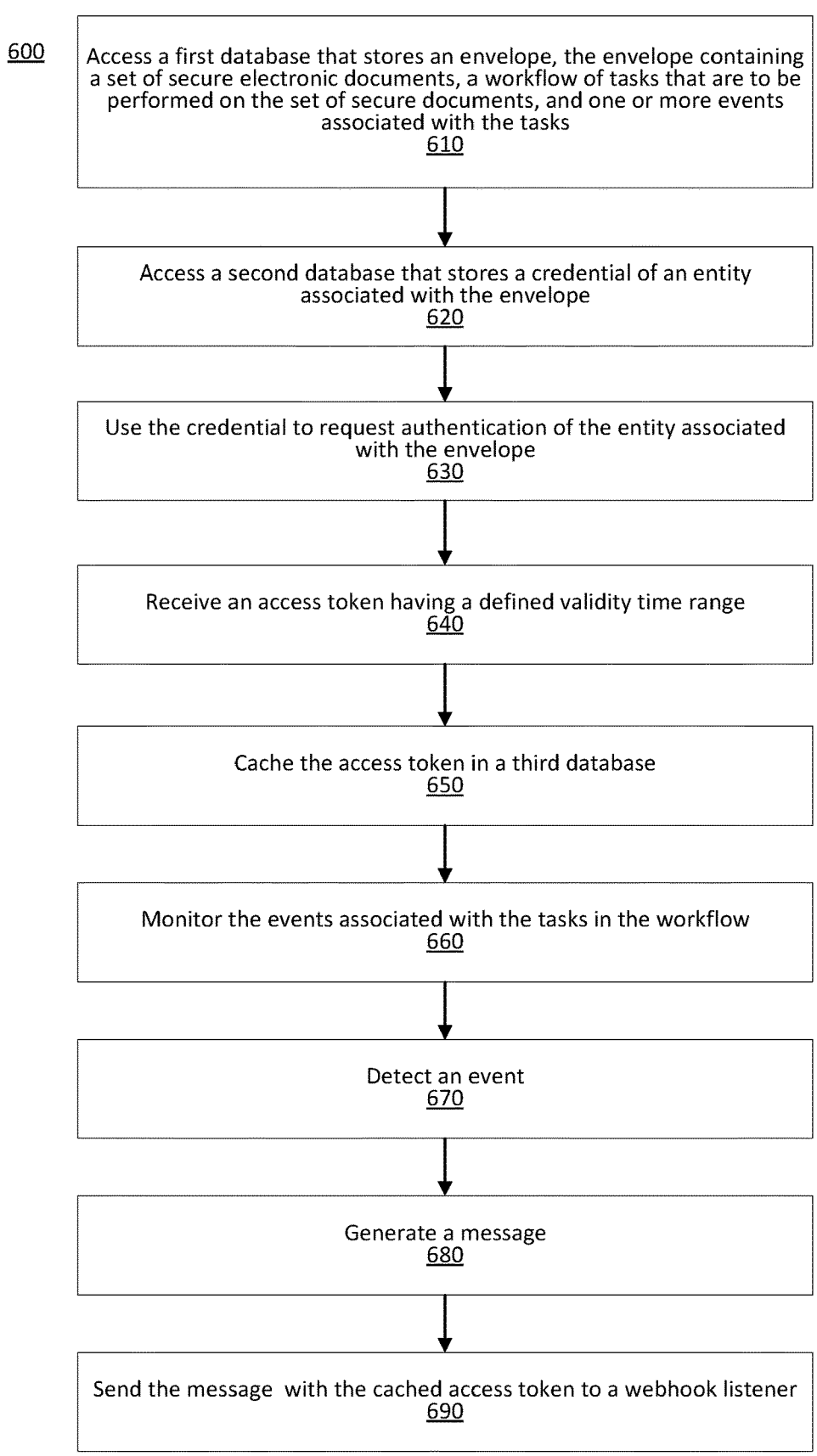
FIG. 6 illustrates an example method for monitoring events associated with tasks performed on secure electronic documents, in accordance with an example embodiment.

FIG. 6 illustrates an example method 600 for monitoring occurrence of events associated with tasks performed on secure documents. The method 600 may be performed by a computing system, such as document management system 140 of FIG. 1 or 2A-2D. The computing system accesses 610 a first database that stores an envelope, such as envelope store 214 of FIG. 2A-2D. The envelope is a data structure that contains a set of secure electronic documents, a workflow of tasks that are to be performed on the set of secure documents, and one or more events associated with the tasks. In some embodiments, the envelope also includes an identity of a user that is to perform the tasks, e.g., reviewing or signing a document.

The computing system also accesses 620 a second database (e.g., credential store 216 of FIGS. 2A-2D) that stores a credential of an entity associated with the envelope. The credential may be entered by an administrator of the entity during configuration of an entity account. The credential delegates certain permission to the computing system, such as permission to send messages associated with events to a webhook listener on behalf of the entity. In some embodiments, the credential includes a username and a password that may be authenticated by an authentication service, e.g., identity provider system 150.

The computing system then uses 630 the credential to request authentication of the entity associated with the envelope. For example, the computing system may send the credential (e.g., a username and a password) to the authentication service (e.g., identity provider system 150), causing the authentication service to verify the credential. Responsive to authenticating the credential, the authentication service generates and sends an access token to the computing system. The access token has a defined validity time range. The computing system then receives 640 the access token from the authentication service, and caches 650 the access token in a third database, such as access token cache store 219 of FIGS. 2A-2D.

At the same time, the computing system monitors 660 the events associated with the tasks in the workflow. In some embodiments, the computing system implements an asynchronous service (e.g., asynchronous service 218 of FIGS. 2A-2D) to asynchronously detect events defined associated with the tasks in the workflow. Responsive to detecting 670 an occurrence of at least one event, the computing system generates 680 a message describing the event, and sends 690 the message with the cached access token to the webhook listener. In some embodiments, the message is packaged in a specific data structure, such as in a JSON format, or an XML format.

Figure 7:
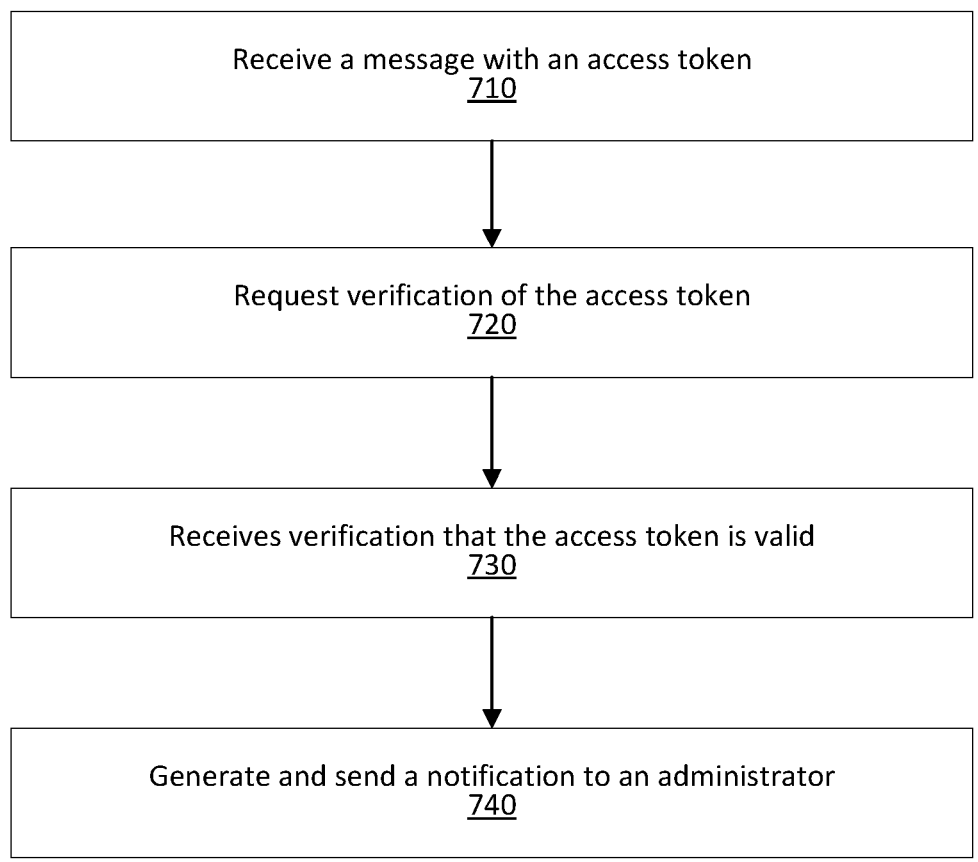
FIG. 7 illustrates an example method for generating and sending a notification to an administrator in response to detecting an event, in accordance with an example embodiment.

FIG. 7 illustrates a flowchart of an example method 700 for generating a notification to an administrator. The method 700 may be performed by a webhook listener, such as webhook listener 160. The webhook listener receives 710 a message describing a detected event with an access token from a computing system, such as the document management system 140.

Responsive to receiving the message, the webhook listener requests 720 verification of the access token. For example, the webhook listener may send the access token to an authentication service (e.g., identity provider system 160), causing the authentication service to verify the access token. Responsive to verifying that the access token is valid, the authentication service notifies the webhook of the verification result. The webhook receives 730 verification that the access token is valid. Responsive to receiving the verification that the access token is valid, webhook generates and sends 740 a notification to an administrator, an application (e.g., administrator application 112), and/or any client device (e.g., administrator client device 110) that is set up to receive the notification.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   determining, by one or more processors, a credential of an entity associated with an envelope, the envelope comprising an electronic document;
   determining, by the one or more processors, an access token based on the credential of the entity; and
   based on detecting, by the one or more processors, an occurrence of an event associated with the electronic document:
   generating, by the one or more processors, a message based on the event; and
   outputting, by the one or more processors, both the access token and the message to a webhook listener, wherein the webhook listener is configured to, based on a determination that the access token is valid, generate a notification for the entity based on the message and output the notification.

2. The method of claim 1, wherein the event is associated with a completion of a task in a workflow for the electronic document.

3. The method of claim 1, wherein the webhook listener exposes an endpoint uniform resource locator (URL) configured to receive the access token and the message.

4. The method of claim 3, further comprising instantiating, by the one or more processors, the webhook listener based on one or more of the envelope or the entity.

5. The method of claim 1, wherein the message is packaged in a specific data structure.

6. The method of claim 5, wherein the specific data structure is JSON format.

7. The method of claim 5, wherein the specific data structure is XML format.

8. The method of claim 1, wherein the event is defined by the envelope.

9. The method of claim 1, wherein determining the access token comprises:
   outputting the credential of the entity to an identity provider system; and
   receiving the access token from the identity provider system.

10. The method of claim 9, wherein the webhook listener is configured to determine that the access token is valid using the identity provider system.

11. The method of claim 1, wherein the event comprises a completion of a task of a workflow for the electronic document.

12. The method of claim 11, wherein the task of the workflow comprises one or more of an authentication of an identity of a user, a review of the electronic document by the user, or signing of the electronic document by the user.

13. The method of claim 1, further comprising:
   storing, by the one or more processors, the access token in a cache, wherein the access token comprises a defined validity time range; and
   based on detecting, by the one or more processors, an occurrence of a subsequent event associated with the electronic document:
   retrieving, by the one or more processors and during the defined validity time range, the access token from the cache;
   generating, by the one or more processors, a subsequent message based on the subsequent event; and
   outputting, by the one or more processors, both the access token retrieved from the cache and the subsequent message to the webhook listener.

14. The method of claim 13, wherein the webhook listener is configured to, based on a determination that the access token is not valid, refrain outputting the notification for the message.

15. Non-transitory computer-readable media comprising instructions that, when executed, cause one or more processors to:
   determine a credential of an entity associated with an envelope, the envelope comprising an electronic document;
   determine an access token based on the credential of the entity; and
   based on a detection of an occurrence of an event associated with the electronic document;
   generate a message based on the event; and
   output both the access token and the message to a webhook listener, wherein the webhook listener is configured to, based on a determination that the access token is valid, generate a notification for the entity based on the message and output the notification.

16. The non-transitory computer-readable media of claim 15, wherein the event is associated with a completion of a task in a workflow for the electronic document.

17. The non-transitory computer-readable media of claim 15, wherein the webhook listener exposes an endpoint URL configured to receive the access token and the message.

18. The non-transitory computer-readable media of claim 17, wherein the instructions further cause the one or more processors to instantiate the webhook listener based on one or more of the envelope or the entity.

19. The non-transitory computer-readable media of claim 15, wherein the message is packaged in a specific data structure.

20. A system comprising:
   one or more processors; and
   non-transitory computer-readable media comprising memory with instructions encoded thereon, where the instructions cause the one or more processors to:
   determine a credential of an entity associated with an envelope, the envelope comprising an electronic document;
   determine an access token based on the credential of the entity and
   based on a detection of an occurrence of an event associated with the electronic document;
   generate a message based on the event; and
   output both the access token and the message to a webhook listener, wherein the webhook listener is configured to, based on a determination that the access token is valid, generate a notification for the entity based on the message and output the notification.

* * * * *